(12) United States Patent
Grainger

(10) Patent No.: US 6,976,817 B1
(45) Date of Patent: Dec. 20, 2005

(54) POSITIVE LOCKING FASTENER

(76) Inventor: Phillip T. Grainger, 4158 Springdale Rd., Stow, OH (US) 44224

( * ) Notice: Subject to any disclaimer, the term of this patent is extended or adjusted under 35 U.S.C. 154(b) by 238 days.

(21) Appl. No.: 10/133,929

(22) Filed: Apr. 26, 2002

Related U.S. Application Data

(63) Continuation-in-part of application No. 09/475,341, filed on Dec. 30, 1999, now abandoned.

(51) Int. Cl.[7] .............................................. F16B 39/10
(52) U.S. Cl. ..................... 411/204; 411/120; 411/329
(58) Field of Search ................ 411/326, 329, 119–121, 411/202–208, 197, 198, 191–194, 160–165, 411/149, 150

(56) References Cited

U.S. PATENT DOCUMENTS

| | | | |
|---|---|---|---|
| 388,764 A | * | 8/1888 | Cooke |
| 484,745 A | * | 10/1892 | Pugh ........................... 411/120 |
| 732,411 A | * | 6/1903 | Hughes ........................ 411/131 |
| 969,397 A | * | 9/1910 | Partridge |
| 1,070,946 A | * | 8/1913 | Davis |
| 1,184,930 A | * | 5/1916 | Coulter |
| 1,247,236 A | * | 11/1917 | Dobbins |
| 1,261,616 A | * | 4/1918 | Reinicker .................... 411/120 |
| 1,269,059 A | * | 6/1918 | D'Arden ...................... 411/117 |
| RE15,379 E | * | 6/1922 | Bechberger |
| 1,603,952 A | * | 10/1926 | Huffer ......................... 411/204 |
| 1,731,337 A | * | 10/1929 | Giovannini |
| 3,804,140 A | * | 4/1974 | Harper ........................ 411/116 |
| 4,781,502 A | * | 11/1988 | Kushnick ...................... 411/87 |

* cited by examiner

*Primary Examiner*—Flemming Saether
(74) *Attorney, Agent, or Firm*—Renner, Kenner, Bobak

(57) ABSTRACT

A positive locking fastener for inhibiting rotation of a nut located on a shaft of a threaded fastener, the positive locking fastener comprising: a first plate and a second plate receivable on the shaft, wherein at least one of said plates is rotationally fixed relative to the shaft; a locking assembly axially coupling said first plate to said second plate, said locking assembly including an opening formed in said second plate and a projection extending axially outward from said first plate, wherein said projection is adapted to extend through said opening and overlap a portion of said second plate; and a nut receiving aperture formed on one of said plates having a nut engaging member adapted to rotationally couple the nut to said plates, whereby the nut is rotationally fixed relative to the shaft to inhibit rotation of the nut.

7 Claims, 5 Drawing Sheets

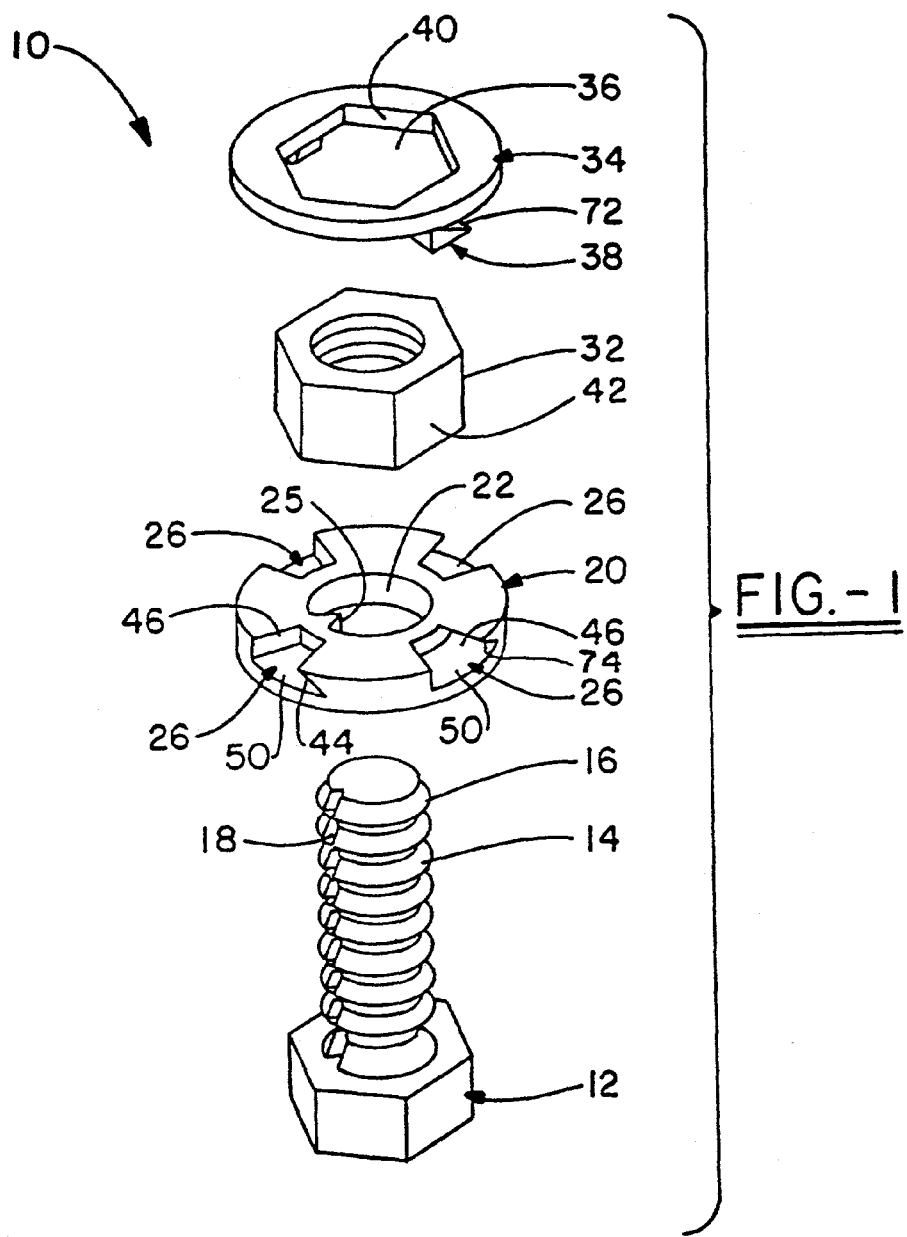
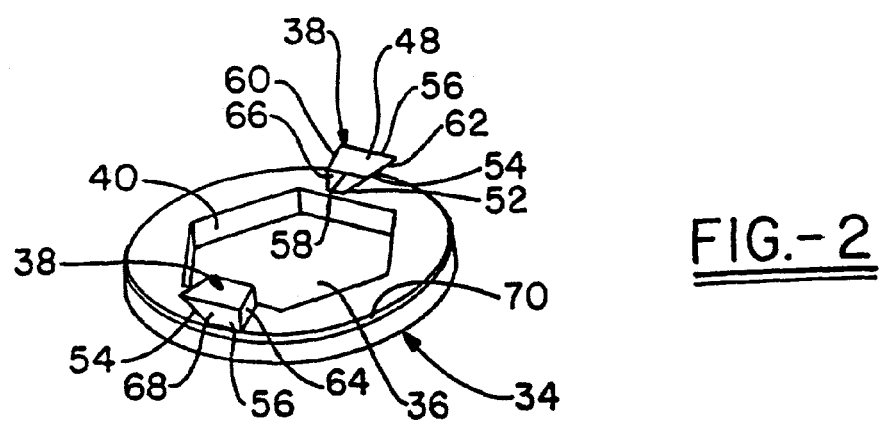

POSITIVE LOCKING FASTENER

RELATED APPLICATIONS

This application is a continuation-in-part of U.S. patent application Ser. No. 09/475,341 filed Dec. 30, 1999 now abandoned.

TECHNICAL FIELD

The present invention generally relates to fasteners. More particularly, the present invention relates to a vibration resistant fastener. Even more particularly, the present invention relates to a positive locking fastener that resists loosening caused by vibration by locking the fastener such that it cannot rotate.

BACKGROUND OF THE INVENTION

Fasteners are well known in the art. Often fasteners may loosen as a result of vibration or thermal expansion. To alleviate this problem, a wide variety of lock washers have been developed in the art. Lock washers attempt to prevent loosening by increasing the frictional forces between the nut and a stationary surface. Some examples include, a split ring lock washer, a star lock washer, or spring washers. Although these types of lock washers inhibit rotation of the nut by increasing the frictional forces acting opposite to the nut's rotation, they do not provide a positive rotation stopping force.

In a similar manner, nylon inserts have been used to constrict the internal diameter of the threads on the exit side of the nut. Again, these inserts increase the frictional forces, in this case between the bolt and nut threads, that act to resist rotation of the nut. Alternatively, it is known to simply crimp the nut to increase rotational friction. As in the case of lock washers, these methods of increasing the rotational friction do not provide a positive stopping force against rotation of the nut. In addition, nylon inserts are more susceptible to deformation caused by excess heat or corrosive agents.

One known device for positively stopping nut rotation is the castle nut. The castle nut has a crenelated upper surface that may be used to positively stop rotation of the nut. To accomplish this, the nut is tightened to its desired level and then, a hole is drilled through the bolt in a gap between the nut's crenelations. A cotter pin is then passed through this hole and secured in place. In this way, the nut cannot rotate or loosen because the pin provides a positive stop. Unfortunately, the castle nut requires customized placement of the pin to prevent rotation. In other words, the user must drill a hole through each fastener on which the castle nut will be used. The positioning of the hole along the length of the bolt will depend on the thickness of the parts being joined, the number of washers, and the desired tightness. Consequently, the castle nut is rendered job specific preventing it from being mass produced and having universal application. Moreover, any adjustment of the nut would require drilling a new hole.

Therefore, a need exists for positive locking fastener that prevents loosening of a nut brought on by vibration. A need also exists for a positive locking fastener that may be mass produced and applied universally. A further need exists for a positive locking fastener that can move to more than one location along the bolt shaft without having to remodify the bolt.

SUMMARY OF THE INVENTION

It is therefore, an object of the present invention to provide a positive locking fastener that prevents rotation of a nut caused by vibration.

It is another object of the present invention to provide a positive locking fastener having a washer that is rotationally locked in place and a cap ring that fits over the nut coupling the nut to the rotationally fixed washer.

It is another object of the present invention to provide a positive locking fastener that does not limit the location along the bolt shaft where the nut can be tightened.

It is another object of the present invention to further provide a positive locking fastener that includes a bolt having a groove along its shaft for receiving a key mounted on a washer, such that the washer is rotationally fixed and a locking assembly for rotationally coupling the nut to the rotationally fixed washer.

It is another object of the present invention to provide a positive locking fastener that is not job specific.

It is another object of the present invention to provide a positive locking fastener that may be mass produced.

In view of these objects the present invention generally provides a positive locking fastener for inhibiting rotation of a nut located on a shaft of a threaded fastener. The positive locking fastener including a washer rotationally locked to the threaded fastener, a cap ring having an aperture sized to accept the nut, whereby the cap ring slides over the nut, and a locking assembly rotationally coupling the washer to the cap ring.

The present invention further provides a positive locking fastener for preventing rotation of a nut including a threaded fastener having an axial groove, a washer including an opening sized to fit over the threaded fastener, a key extending inwardly from the washer into the opening and sized to fit into the groove, wherein the nut is rotationally coupled to the washer.

The present invention further provides a positive locking fastener for preventing rotation of a nut including a threaded fastener having an axial groove, a washer having two outer surfaces and an inner wall defining an opening, a first projection carried on the washer and extending into the opening, and a first recess formed in one of the outer surfaces of the washer; a cap ring having a pair of outside surfaces and an inner wall defining an aperture, the inner wall being sized to fit over and engage the nut; the cap ring having a second projection extending axially outwardly from one of the outside surfaces and adapted to fit within the recess.

The present invention further provides a positive locking fastener for inhibiting rotation of a nut located on a shaft of a threaded fastener, the positive locking fastener including a first plate and a second plate receivable on the shaft, wherein at least one of the plates is rotationally fixed relative to the shaft, a locking assembly axially coupling the first plate to the second plate, the locking assembly including an opening formed in the second plate and a projection extending axially outward from the first plate, wherein the projection is adapted to extend through the opening and overlap a portion of the second plate, and a nut receiving aperture formed on one of the plates having a nut engaging member adapted to rotationally couple the nut to the plates, whereby the nut is rotationally fixed relative to the shaft to inhibit rotation of the nut.

The present invention further provides a positive locking fastener for inhibiting rotation of a nut located on a shaft of a threaded fastener, the positive locking fastener including a first plate and a second plate receivable on the shaft, wherein at least one of the plates is rotationally fixed relative to the shaft, a locking assembly axially coupling the first plate to the second plate, the locking assembly including an opening formed in the second plate and a projection extending axially from the first plate, the projection having a guide surface adapted to draw the first plate and the second plate together in an axial direction to effect the axial coupling, and a nut receiving aperture formed on one of the plates having a nut engaging member adapted to rotationally couple the nut to the one of the plates, whereby a nut is rotationally fixed relative to the shaft to inhibit rotation thereof.

BRIEF DESCRIPTION OF THE DRAWINGS

FIG. 1 is an exploded partially schematic assembly drawing of the present invention showing a bolt, a washer, and a cap ring according to the present invention;

FIG. 2 is a perspective view of a cap ring according to the present invention;

DETAILED DESCRIPTION OF THE INVENTION

Figure 3:
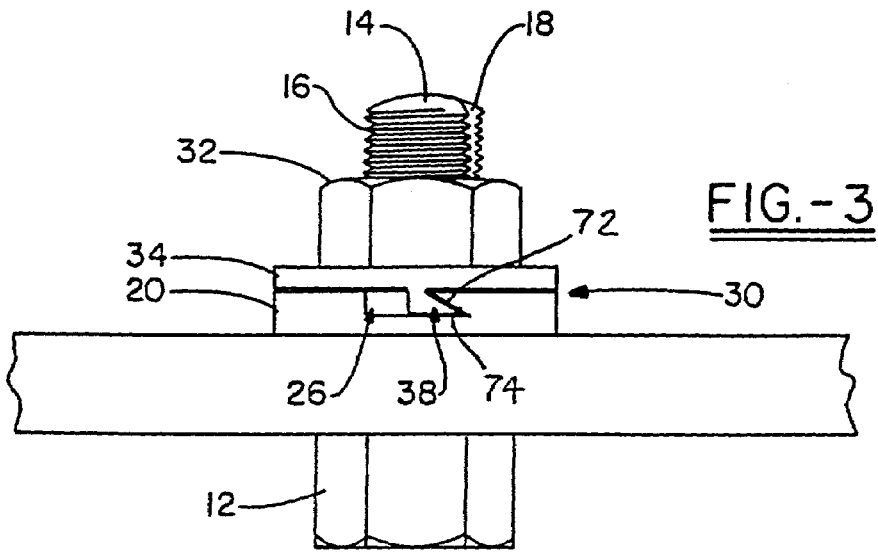
FIG. 3 is a side elevational view of the present invention in a locked position.

A first embodiment of a positive locking fastener according to the present invention is shown in FIG. 1. The positive locking fastener of the present invention is referred to generally by the numeral 10 in the accompanying figures. Positive locking fastener 10 may be constructed of any material common in the fastening art including woods, metals, plastics, and ceramic materials. The choice of material, as can be appreciated, is largely determined by the end use of the fastener. The positive locking fastener 10 includes a threaded fastener 12 having a shaft 14 carrying a plurality of threads 16. The threaded fastener 12 may be provided with an axial groove 18 that may be used to prevent rotation of washer 20, as will be described below.

Washer 20 has a hole 22 adapted to slide over the shaft 14 of threaded fastener 12. As shown, washer 20 carries a key 25 adapted to be received within axial groove 18. To slip washer 20 over threaded fastener 12, the key 25 and axial groove 18 are aligned, and then key 25 is free to move axially in relation to the shaft 14 of threaded fastener 12. Rotational movement, however, is prevented by the contact between the key 25 and the walls of axial groove 18. It should be understood, that other known methods of preventing rotational movement of washer 20 with respect to shaft 14 of threaded fastener 12 may be used including, but not limited to clamping or pinning the washer 20 to shaft 14.

Washer 20 is provided with a recess 26 that forms a part of a locking assembly 30, FIG. 3, as will be described below. Locking assembly 30 is used to prevent rotation of a conventional nut 32 by rotationally locking the nut 32 to the rotationally fixed washer 20. To that end, a cap ring 34 is provided with an aperture 36 for receiving the nut 32 and carries a projection 38 to be received within recess 26. Once the projection 38 is within recess 26, the contact between projection 38 and the walls of recess 26 prevents rotational movement of cap ring 34 with respect to washer 20. Since washer 20 is rotationally fixed by key 25, the entire cap ring 34, nut 32, and washer 20 assembly become rotationally fixed to shaft 14.

In terms of assembly, the nut 32 is prevented from rotating by first slipping the washer 20 over the shaft 14 of a threaded fastener 12 and using key 25 to prevent rotation of washer 20 about shaft 14 of threaded fastener 12. Then, a nut 32 is tightened according to the fastener application requirements. Once the nut 32 is tightened, cap ring 34 is fitted over nut 32 and the projection 38 extends into recess 26 on washer 20 preventing rotation of cap ring 34 with respect to washer 20.

The assembled position is best shown in FIG. 3. Once in this position, the inner wall 40, FIG. 1, of cap ring 38 engages a face 42 of nut 32 and prevents rotation of nut 32, such that nut 32 and cap ring 34 are rotationally coupled. In other words, nut 32 cannot rotate unless cap ring 34 rotates. When in the locked position, cap ring 34 will not rotate because it is coupled to washer 20, which is rotationally fixed to shaft 14. Since nut 32 is coupled to cap ring 34, it is similarly rotationally fixed.

To prevent cap ring 34 from axially disengaging washer 20, the locking assembly 30 may further include a lip 44 that extends over a portion of projection 38 when in the locked position. It should be appreciated, that a number of known mechanisms for preventing axial movement of cap ring 34 may be used including using a resilient fastener as a projection 38 that simply plugs into washer 20. As shown, recess 26 has a recess opening 46 defined between the edge of lip 44 and the top surface of washer 20. The recess opening 46 is slightly larger than projection 38, such that the projection 38 is insertably received within the recess opening 46. Projection 38 passes through recess opening 46 and its base 48 rests on the floor 50 of recess 26.

As best shown in FIG. 2, projection 38 necks from its base 48 to a top portion 52 creating an indentation 54. When cap ring 34 is rotated into a locked position, the lip 44 extends into the indentation 54 of projection 38 and inhibits axial movement of the cap ring 34. As shown, lip 44 and projection 38 have angular contact surfaces. It should be readily understood that other configurations may be used to create axial locking contact. For example, projection 38 and lip 44 may be L-shaped.

Projection 38, as shown in FIG. 2, is a trapezoidal solid having a base 48 defined by an outer edge 56 an inner edge 58, a first radial edge 60 and a second radial edge 62. Projection 38 extends axially outwardly from cap ring 34 and terminates at base 48 forming four side walls 64, 66, 68, 72. The first wall 64 is generally rectangular in shape and extends substantially perpendicular to cap ring 34. The inner and outer side walls 66, 68 are generally trapezoidal in shape and extend substantially perpendicularly from cap ring 34. As can be appreciated, inner and outer sidewalls 66, 68 may be somewhat arcuate and conform to the outer diameter 70 of cap ring 34. The second wall 72 of projection 38 extends axially and radially outwardly from cap ring 34 forming a sloped face. The lip 44 of recess 26 is similarly provided with a sloped face 74 that contacts the second wall 72 of projection 38 when the cap ring 34 is in a locked position.

When in the locked position, the contact between sloped face 74 and second wall 72 of projection 38 restricts the rotational movement of cap ring 34 with respect to washer 20. This contact positively stops rotation of the cap ring 34 in the counter-clockwise direction. Since the aperture 36 is sized to snugly engage faces 42 of nut 32, the nut 32 is prevented from rotating relative to cap ring 34. In this way, the nut 32, cap ring 34, and washer 20 are rotationally bound to each other. Since the washer 20 is constrained from rotational movement about shaft 14 of bolt 12 by the key 25, the cap ring 34 and nut 32 are similarly constrained.

To achieve this constraint, the nut 32 may be over-tightened against washer 20. Cap ring 34 is slid over nut 32 and projection 38 passes through the recess opening 46. To move locking assembly 30 into a locked position the nut 32 and consequently cap ring 34 are rotated counter-clockwise, until projection 38 is aligned with recess opening 48. At this point projection 38 enters recess 26. The nut 32 and cap ring 34 are further rotated in the counter-clockwise direction bringing the second wall 72 into contact with sloped face 74. In this way, lip 44 overhangs a portion of projection 38 preventing axial outward movement of cap ring 34. Similarly, the sloped face 74 of lip 44 engages projection 38 preventing rotation of cap ring 34 with respect to washer 20. To facilitate movement between the unlocked and the locked positions 30, the second wall 72 is the leading wall in the counterclockwise rotational direction.

Additional projections 38 or recesses 26 may be added to further facilitate locking of washer 20 to cap ring 34. For example, additional recesses 26 may be added to provide several locations at which the projection 38 may be received. Or, if a pair of projections 38 is used, a corresponding pair of recesses 26 would be located on washer 20 to receive the pair of projections 38. Additional recess pairs could then be added to provide multiple locations for receiving the projection pair.

Furthermore, the above description has described a locking assembly 30 with projections 38 on cap ring 34 and recesses 26 on washer 20. It should be readily understood that these components may be carried by the opposite parts. For example, washer 20 may have projections 38 extending therefrom and cap ring 34 may include recesses 26. In addition, projections 38 have been described as being integrally formed with cap ring 34. It should be appreciated that these projections 38 may be separate members attached or mounted to the cap ring 34 or washer 20. For example, cap ring 34 may be provided with holes and a pin or fastener passing through the hole would be used as the projection.

Figure 6:
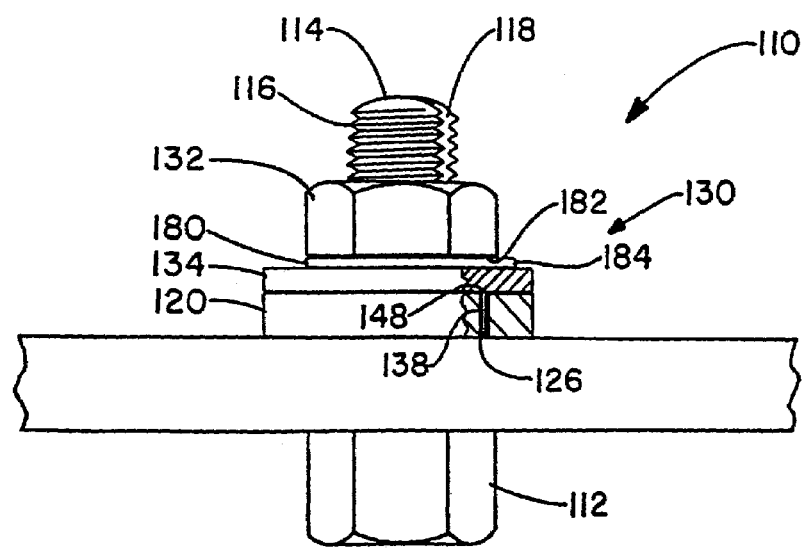
FIG. 6 is a partially cutaway side elevational view of still another alternative embodiment of the present invention.

In a second embodiment of the present invention, shown in FIG. 6, the positive locking fastener 110 has similar structure as the first embodiment. Positive locking fastener 110 includes a threaded fastener 112 having a shaft 114, threads 116, and a groove 118. Positive locking fastener 110 further includes washer 120, nut 132, and cap ring 134. As above, washer 120 and cap ring 134 are coupled to each other by a locking assembly 130.

In this embodiment, locking assembly 130 includes a pin 138 extending axially outwardly from cap ring 134. The locking assembly 130 further includes a cylindrical-shaped recess 126 formed within washer 120 for receiving the pin 138. As can be appreciated, any number of recesses 126 may be provided circumferentially along the surface of washer 120 to provide multiple receiving points for the pin 138. In this way, the amount of adjustment needed to align pin 138 and recess 126 is minimized.

Since the pin 138 is not axially restrained significantly by the walls of the cylindrical recess 126, additional means may be used to prevent axial displacement. For example, the locking assembly 130 may be modified to use a snap-in type of fastener to prevent axial movement. For example, a resilient fastener with a collapsible body could fit through a recess opening 148 that is slightly smaller than the recess 126. Once the resilient fastener is inserted beyond the recess opening 148, the body would expand to the walls of recess 126 limiting its axial movement.

Alternatively, the cap ring 134 may be axially held by an external locking member. For example, a snap-ring 180 may be used to prevent the cap ring 134 from becoming disengaged. The snap-ring 180 is attached to or coupled to the nut 132 adjacent to cap ring 134. The snap-ring 180 is of a slightly larger size than the aperture, such that, the aperture will not slip over the snap-ring 180.

Snap-ring 180 may be held in any known fashion including crimping the snap-ring 180 onto nut 132. Alternatively, nut 132 may be provided with a groove 182, in which, the snap-ring 180 is partially seated. The snap-ring 180 would be of slightly larger thickness than the groove 182 causing it to protrude externally of the nut 132. Since the walls of the groove 182 would axially fix the snap-ring 180 this protruding portion 184 would act as a stop preventing axial movement of cap ring 134.

Figure 4:
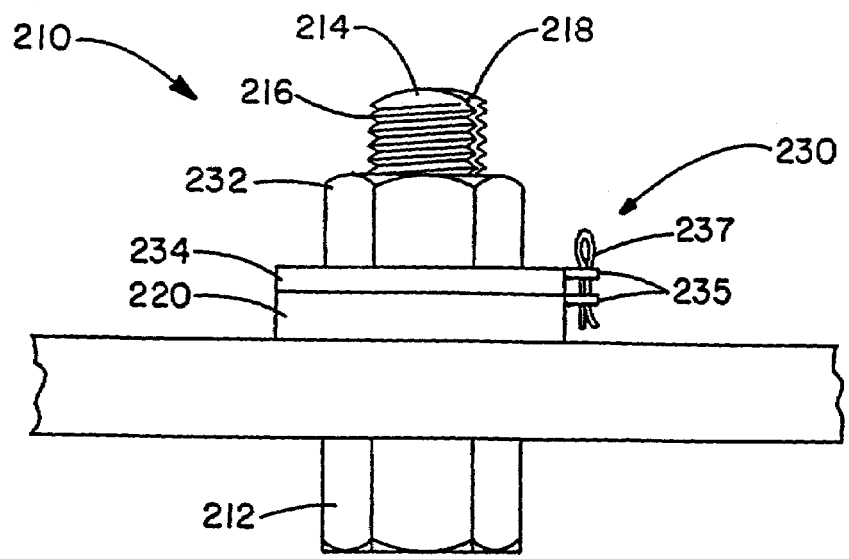
FIG. 4 is a side elevational view of one alternative embodiment of the present invention.

In a third embodiment of the present invention, shown in FIG. 4, a positive locking fastener 210 includes a threaded fastener 212 having a shaft 214, threads 216, and a nut 218, and further includes, a washer 220, a nut 232, and a cap ring 234. In this embodiment, the nut 232 is prevented from rotating in the same manner as discussed in the first embodiment, but the locking assembly 230 includes a pair of locking rings 235 extending from the washer 220 and cap ring 234 respectively. The locking assembly 230 further includes a fastener 237 joining the rings 235 together. Any known fastener may be used including a cotter pin, a wire, a hook, a zip tie, a threaded fastener, a ring or a chain. Other external locking assemblies 230 may be used to fasten the cap ring 234 to the washer 220 including a latch. It should be understood that additional locking assemblies 230 may be placed at any location on washer 220 and cap ring 234. For example, a pair of diametrically opposed rings 235 on each of the washer 220 and cap ring 234 may be used, or a plurality of rings on either the cap ring 234 or washer 220 with a single ring on the opposite member may be used to provide multiple positions for attachment.

Figure 5:
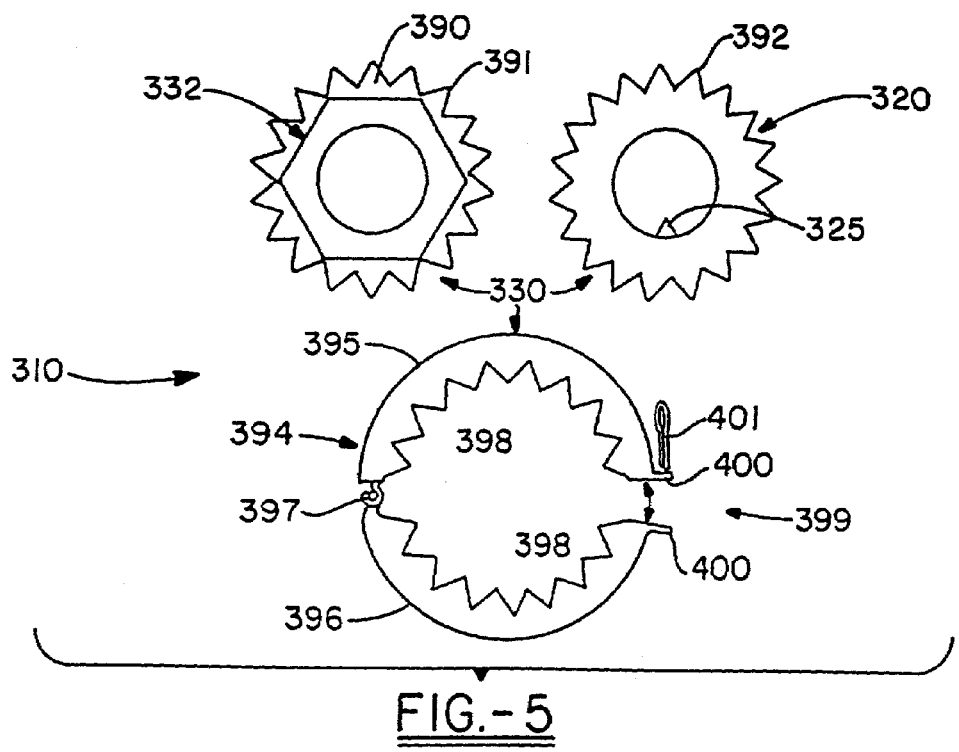
FIG. 5 is a top plan view of a nut, a washer, and a locking ring according to another alternative embodiment of the present invention.

In a fourth embodiment of the invention, shown in FIG. 5, the positive locking fastener 310 includes a threaded fastener (not shown), a washer 320 and a nut 332. Washer 320 and threaded fastener are rotationally locked together as described above. Nut 332 is rotationally coupled to washer 320 by a locking assembly 330. Locking assembly 330 includes a flange 390 extending radially outwardly from the nut 332. The flange 390 carries a shaped projection 391 that corresponds to a similar projection 392 on the circumference of the washer 320. The locking assembly 330 further includes a locking ring 394 for receiving the shaped projections on the washer 320 and nut 332. Locking ring 394 couples washer 320 to nut 332, such that one cannot rotate without the other. As shown in FIG. 5, locking ring 394 has a first side 395 and a second side 396 joined by a hinge 397. When the projections 391, 392 are aligned, lock ring 394 encircles the projections 391, 392 on washer 320 and nut 332 receiving these projections 391, 392 within shaped recesses 398. The lock ring 394 is then closed and locked by a locking assembly 399, which may include a pair of rings 400 and a cotter pin 401.

Figure 7:
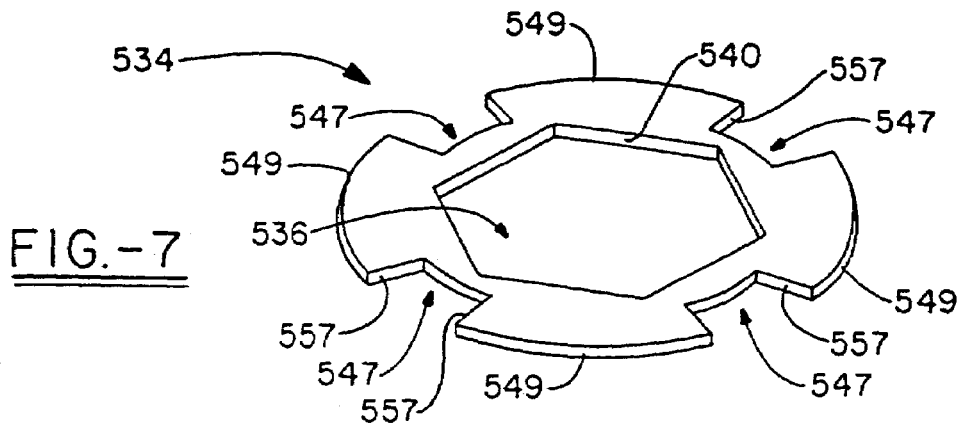
FIG. 7 is a perspective view of a second plate according to the concepts of the present invention.
Figure 8:
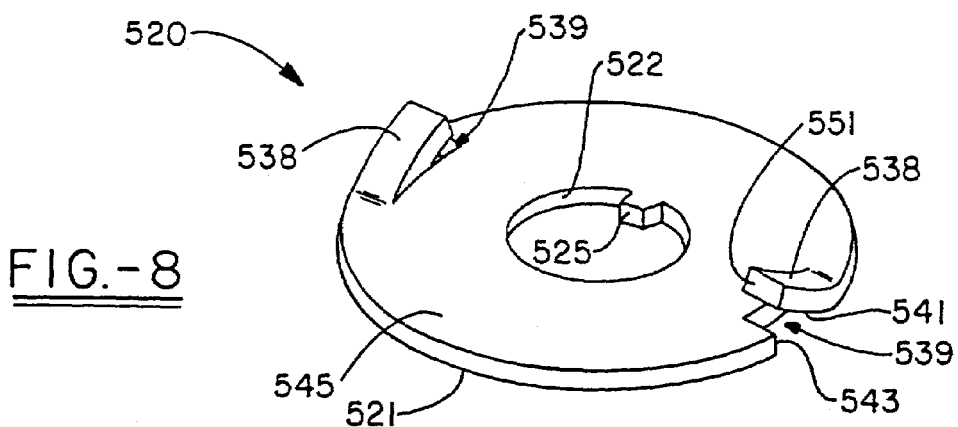
FIG. 8 is a perspective view of a second plate according to the concepts of the present invention.
Figure 9:
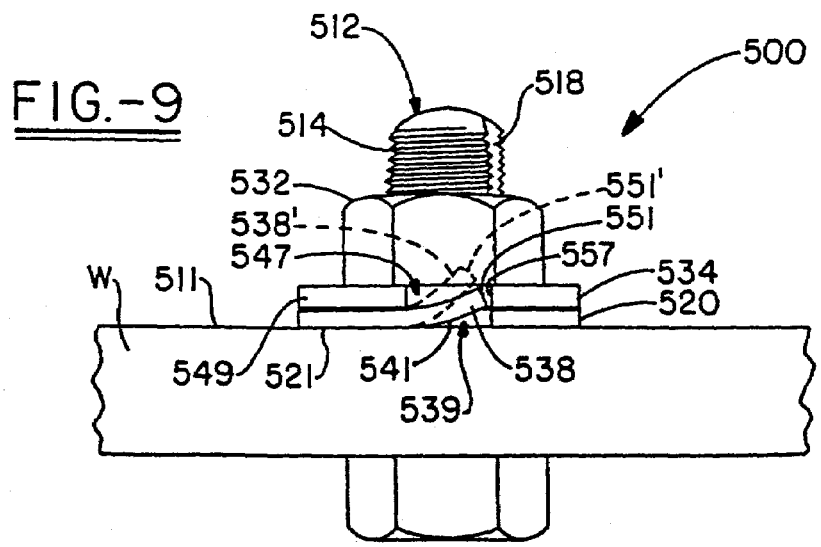
FIG. 9 is a fragmentary side elevational view of an alternative positive locking fastener according to the concepts of the present invention.

In the embodiment shown in FIGS. 7–9, an alternative positive locking fastener assembly is generally indicated by the numeral 500. As described in previous embodiments, assembly 500 is used in conjunction with a threaded fastener 512, for example, a bolt, which has a shaft 514, and a nut 532 received on the shaft 514. As best shown in FIG. 9, a locking assembly, generally indicated by the numeral 530 is incorporated on a first plate 520 and a second plate 534 to interlock plates 520, 534 and positively lock the nut 532 and fastener 512 to prevent loosening of the nut 532 and fastener 512, as described more completely below.

The first plate 520, shown in the lowermost position in FIG. 9 has a bore 522 sized to receive the shaft 514 of the fastener 512, such that, the first plate 520 fits over fastener 512. First plate 520 is rotationally fixed relative to the shaft 514. For example, first plate 520 may be fixed to the workpiece W, as by a fastener or weld. Alternatively, first plate 520 may be rotationally coupled to the shaft 514 of the fastener 512. For example, shaft 514 may be provided with a keyway or groove 518 that receives a key 525 extending radially inward into the shaft 514 receiving bore 522 from the first plate 520. It will be appreciated that the positions of the key 525 and keyway 518 may be reversed to the same effect. It will be appreciated that the components of assembly 500 may be oriented or arranged in different manners, for example, the position of the first plate 520 and second plate 534, as depicted, may be reversed relative to each other without departing from the present invention. The first plate 520 may be placed adjacent the work surface 511 and, as shown, for example, in FIG. 9, the first surface 521 of first plate 520 may contact the work surface 511. It will be appreciated that, if desired, first plate 520 may be spaced from the work surface 511, as by a washer or other suitable spacer.

Locking assembly 530 generally includes at least one projection 538 extending from either or both of said first and second plates 520, 534. For simplicity, the description will proceed with reference to the example of a first plate 520 carrying projection 538. As shown in FIG. 8, first plate 520 may be provided with at least one axially extending projection 538 that engages the second plate 534, as described more completely below. Multiple projections 538 may be used and may, as shown in FIG. 10C, be arranged in diametrically opposed pairs. In the example shown in FIG. 9, first and second projections 538 are arranged in a single pair on opposite sides of first plate 520.

The projections 538 extend axially at a positive slope relative to the plane defined by first plate 520. The projection 538 extends over the plane of first plate 520 and may have a non-constant slope, i.e. a curved profile, or a constant slope forming an inclined profile, as shown. The axial inclined extension of the projection 538 creates a hollow 539 beneath the underside 541 of the projection 538. In the example shown projections 538 are punched from the first plate 520 creating notches 543 in the first plate 520 corresponding to the projections 538. It will be appreciated that projections 538 may be formed without the creation of notches 543 and simply extend over the second surface 545 of first plate 520.

In the example shown, projections 538 maybe thin walled members or tabs. The first plate 520 may be circular, as shown, in which case projections 538 may extend axially and circumferentially outward from first plate 520. In this sense, projections 538 may extend in a counterclockwise or clockwise direction. In the example depicted in FIG. 8, both projections 538 extend in a clockwise direction.

Second plate 534 defines at least one projection receiving opening 547 through which projection 538 extends. As shown in FIG. 7, openings 547 may be in the form of notches, which may be circumferentially spaced by plurality of radially extending flanges 549. Second plate 534 further defines a nut receiving aperture 536 adapted to fit over a nut 532, which includes at least one nut engaging surface 540, adapted to rotatably couple the second plate 534 to the nut 532. In assembling the first and second plates 520, 534, the nut 532 may be rotated to initiate engagement of the projections 538 carried by first plate 520 and the flanges 549 of second plate 534. For example, nut 532 may be over tightened prior to placing the second plate 534 over the nut 532. The second plate 534 may then be placed over the nut 532 with the openings 547 in second plate 534 aligned with the projections 538 on first plate 520, such that, at least the end 551 of projection 538 extends through opening 547 beyond the plane of the second plate 534. At this point, the second plate 534 may be rotated to effect engagement of the projections 538 and flanges 549, for example, as by backing the nut 532 off from the over tightened condition. As the second plate 534 rotates, flanges 549 come into contact with projections 538 of first plate 520. The projections 538 overlap second plate 534 as the edge 557 of flange 549 enters the hollow 539 between the projection 538 and first plate 520. In this way, the first plate and second plate 534 are axially coupled. Due to the first plate 520 being rotationally fixed relative to the fastener 512, both plates 520, 534 are rotationally coupled. In turn, the nut 532 is prevented from loosening by second plate 534.

Figure 10A:
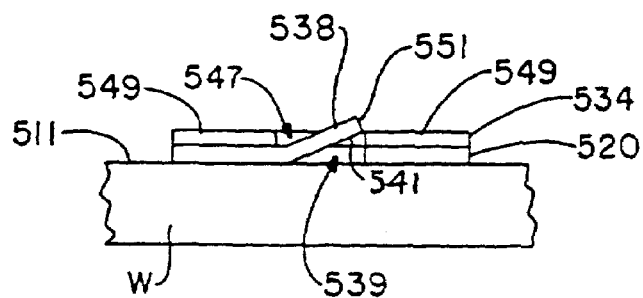
FIG. 10A is a fragmentary side elevational view depicting a projection carried on the first plate extending through an opening on the second plate.
Figure 10B:
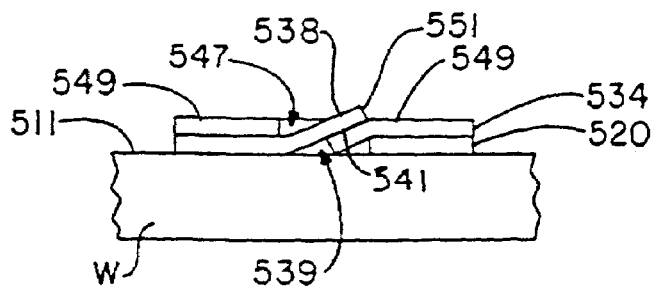
FIG. 10B is a fragmentary side elevational view similar to FIG. 10A schematically depicting rotation of the second plate relative to the first plate to effect engagement of the flange of the second plate with the projection on the first plate causing the flange to deflect downwardly along the guide surface of the projection and into a notch formed in the first plate below the projection.
Figure 10C:
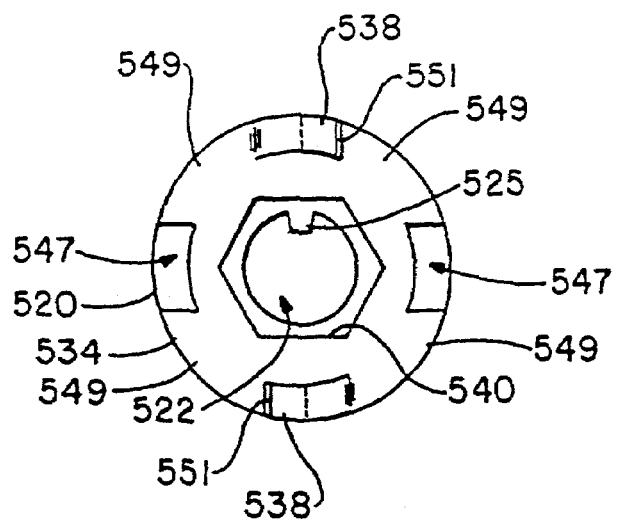
FIG. 10C is a top plan view of the plates depicted in FIG. 10B.

As best shown in FIGS. 10A–10C, the lower surface 541 of projection 538 may slope upward from the first plate 520 to help draw the flange 549 against the projection 538 and into hollow 539. It will be appreciated, that this surface 541 does not have to be linear to perform this function and surfaces of varying slope may be used to guide the flange 549 into hollow 539. In this way, projection 538 overlaps second plate 534 to interlock the first and second plates 520, 534. Projection 538 may be adapted to interfere with second plate 534 to cause deflection of either or both of the projection 538 (FIG. 9) or flange 549 (FIG. 10). To that end, the section of the flange 549 or projection 538, whichever is intended to deflect may be made smaller in the axial sense to promote axial defection.

Deflection of either or both of the projection 538 or flange 549 creates opposing forces in the projection 538 and flange 549 create a spring fit between the plates 520, 534 that improves their coupling. FIG. 9 depicts in an exaggerated form the deflection of the projection 538 in response to contact with the flange 549. FIG. 10 similarly depicts deflection of the flange 549. It will be understood that deflection of either or both of these members is acceptable in forming the spring fit, discussed above.

Therefore, it should be appreciated that the above described invention fulfills its stated objects among others. It should also be understood that various modifications or alterations may be made to the described invention without deviating from its spirit. Consequently, to appreciate the true scope of the invention reference should be made to the following claims.

What is claimed is:

1. A positive locking fastener for inhibiting rotation of a nut located on a shaft of a threaded fastener, the positive locking fastener comprising:

a first plate and a second plate receivable on the shaft, wherein at least one of said plates is rotationally fixed to the shaft;

a locking assembly axially coupling said first plate to said second plate, said locking assembly including an opening formed in said second plate and a projection extending axially outward from said first plate, wherein said projection is adapted to extend through said opening beyond said second plate and overlap a portion of said second plate; and a nut receiving aperture formed on one of said plates having a nut engaging member adapted to rotationally couple the nut to said plates, whereby the nut is rotationally fixed relative to the shaft to inhibit rotation of the nut wherein said portion of said second plate is adapted to deflect upon contacting said projection creating a spring fit therebetween.

2. The positive locking fastener of claim 1, wherein said projection defines a hollow beneath said projection, said projection having a guide surface adapted to direct a portion of said second plate into said hollow upon coupling of said washer and said cap ring.

3. The positive locking fastener of claim 2 further comprising a notch formed in said first plate beneath said projection, where said guide surface directs a portion of said second plate into said notch.

4. The positive locking fastener of claim 2, wherein said guide surface slopes in a linear fashion.

5. A positive locking fastener of claim 1, wherein said guide surface has a positive slope relative to the first plate.

6. A positive locking fastener for inhibiting rotation of a nut located on a shaft of a threaded fastener, the positive locking fastener comprising:

a first plate and a second plate receivable on the shaft;

means for rotationally fixing at least one of said plates to the shaft;

a nut receiving aperture formed on one of said plates; and a locking assembly axially coupling said first plate to said second plate, said locking assembly including an opening formed in said second plate and a projection extending axially outward from said first plate, wherein said projection is adapted to extend through said opening beyond said second plate and engage a portion of said second plate, said portion of said second plate being adapted to deflect upon contacting said projection creating a spring fit therebetween.

7. The positive locking fastener of claim 6, wherein said projection is a tab configured to deflect axially upon contacting said portion of said second plate, said tab having a substantially uniform thickness.

* * * * *